Figure 4:
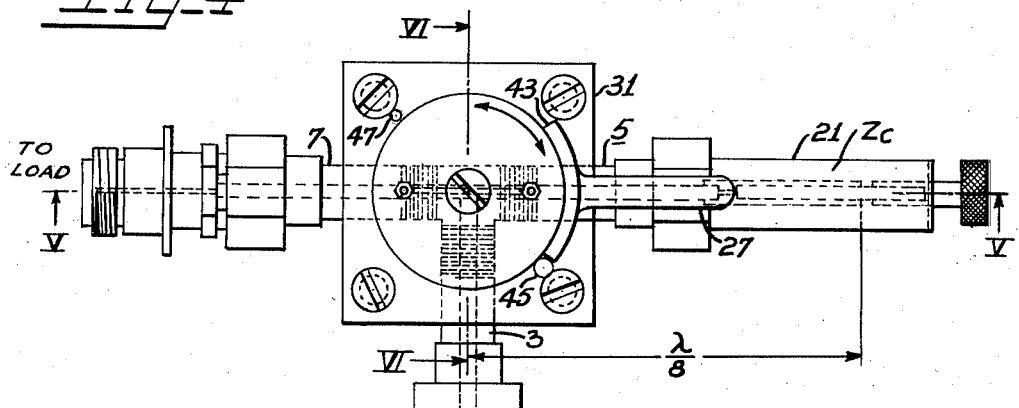

March 3, 1953
G. H. BROWN
2,630,474
TRANSMISSION LINE MEASURING SYSTEM
Filed Aug. 6, 1947
3 Sheets-Sheet 1
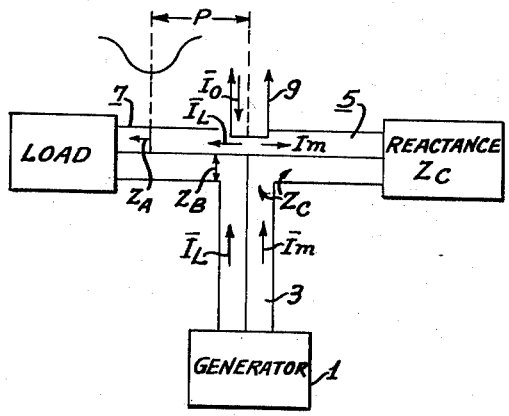
Fig. 1
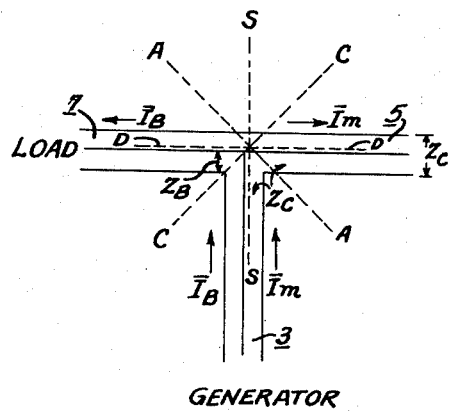
Fig. 2
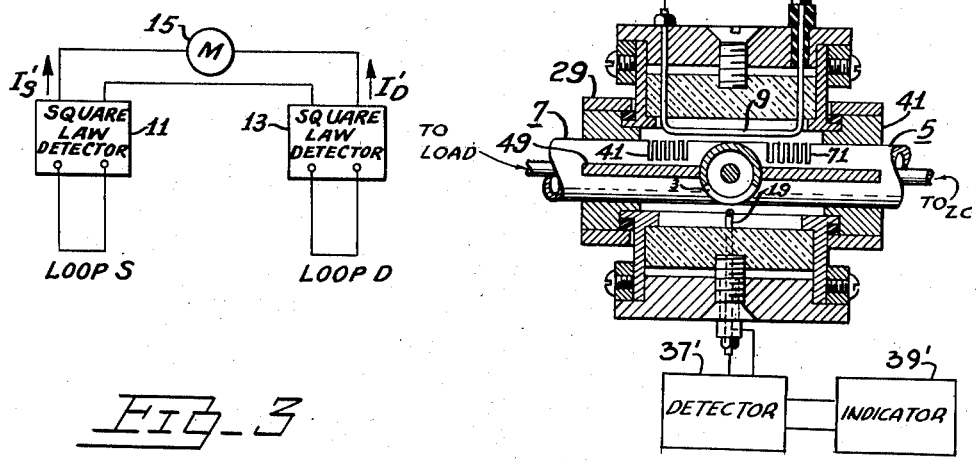
Fig. 3
Fig. 7
Inventor
GEORGE H. BROWN
By C. D. Tuska
Attorney March 3, 1953

G. H. BROWN 2,630,474

TRANSMISSION LINE MEASURING SYSTEM

Filed Aug. 6, 1947

3 Sheets-Sheet 2

Inventor
GEORGE H. BROWN
By
C. D. Lucka
Attorney

INVENTOR.
GEORGE H. BROWN

Patented Mar. 3, 1953

2,630,474

UNITED STATES PATENT OFFICE 2,630,474

TRANSMISSION LINE MEASURING SYSTEM

George H. Brown, Princeton, N. J., assignor to Radio Corporation of America, a corporation of Delaware Application August 6, 1947, Serial No. 766,735

15 Claims. (Cl. 175—183)

This invention relates generally to transmission line measuring apparatus and more particularly to improved reflectometers for indicating load matching, the magnitude and sign of the phase angle of the load impedance and the magnitude of the power delivered to a load through a coaxial or open-wire transmission line.

Customary procedure in matching coaxial transmission lines to a load, in measuring load impedance or in determining the power transmitted to said load has been to employ a slotted section of coaxial line and a sliding-probe indicator. Although this method is quite satisfactory, it is essential that the operator have some knowledge of transmission line theory and practice in order that such measurements may be readily made. In the case of a load having several adjustable elements, the measurement and matching process may be quite complicated. Since the slotted line and movable probe apparatus are primarily laboratory equipment, they are not well suited for field measurements. The instant invention comprises a simple T junction of coaxial line having one or more coupling loops selectively inductively coupled to and capacitively shielded from the conductors of the line T junction.

A first embodiment of the invention permits the measurement of the degree and sign of load impedance mismatch to the transmission line. A second embodiment of the invention permits measurements of load matching, load impedance, load current, reflection coefficient and standing wave ratio characteristics of the system. A third embodiment of the invention permits additional measurements of the magnitude and sign of the phase angle of the load impedance. The various embodiments of the instant invention comprise improvements over the devices disclosed and claimed in the copending U. S. application of O. M. Woodward Serial No. 590,271, filed April 25, 1945, and assigned to the same assignee as the instant application. Fundamentally, the several embodiments of the instant invention comprise current comparison systems in which the current in the load line and a reactive branch line is compared to the current in the generator line which is connected through the T junction to both the load line and the reactively terminated line. One or more current pickup loops are symmetrically placed with respect to the T junction to couple selectively magnetically to three coaxial lines which are connected respectively to the generator, the reactively terminated line, and the load line. The reactively terminated line is matched with an adjustable reactor having an impedance value equivalent to the line surge impedance. The coupling loop or loops may be fixed or rotatable and are coupled to the T junction in different manners depending upon the type of measurement to be made, as will be described in greater detail hereinafter. The structure may be readily modified for measurements on an open-wire line.

Among the objects of the invention are to provide an improved method of and means for measuring the magnitude and sign of the phase angle of the load impedance in a system for transmission of energy through a transmission line connecting a generator to a load. Another object of the invention is to provide an improved reflectometer for measuring the degree and sign of mismatch of a load connected to a coaxial transmission line. An additional object of the invention is to provide an improved reflectometer for measuring the impedance of a load connected to a coaxial transmission line. A further object of the invention is to provide an improved reflectometer for measuring the sign of the phase angle of current transmitted to a load through a coaxial transmission circuit. A still further object of the invention is to provide an improved device for measuring the reflection coefficient or the standing wave ratio in a coaxial transmission line connecting a high frequency generator to a load. Another object is to provide an improved device for measuring the power transmitted through a coaxial transmission line connecting a generator to a load. An additional object is to provide an improved reflectometer comprising a T junction of three coaxial transmission lines, and at least one coupling loop inductively coupled to said T junction for measuring the energy characteristics in a transmission line connecting a generator to an unknown load and to a reactively terminated load.

Figure 5:
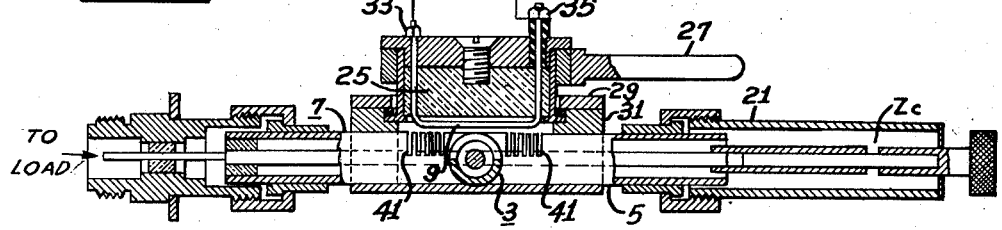
Figure 6:
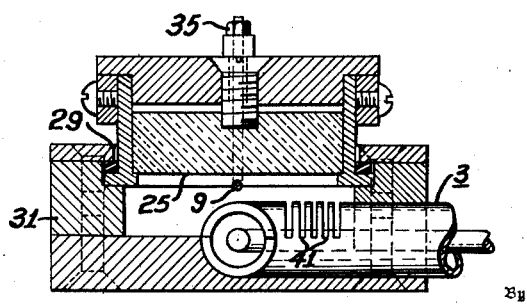
Figure 8:
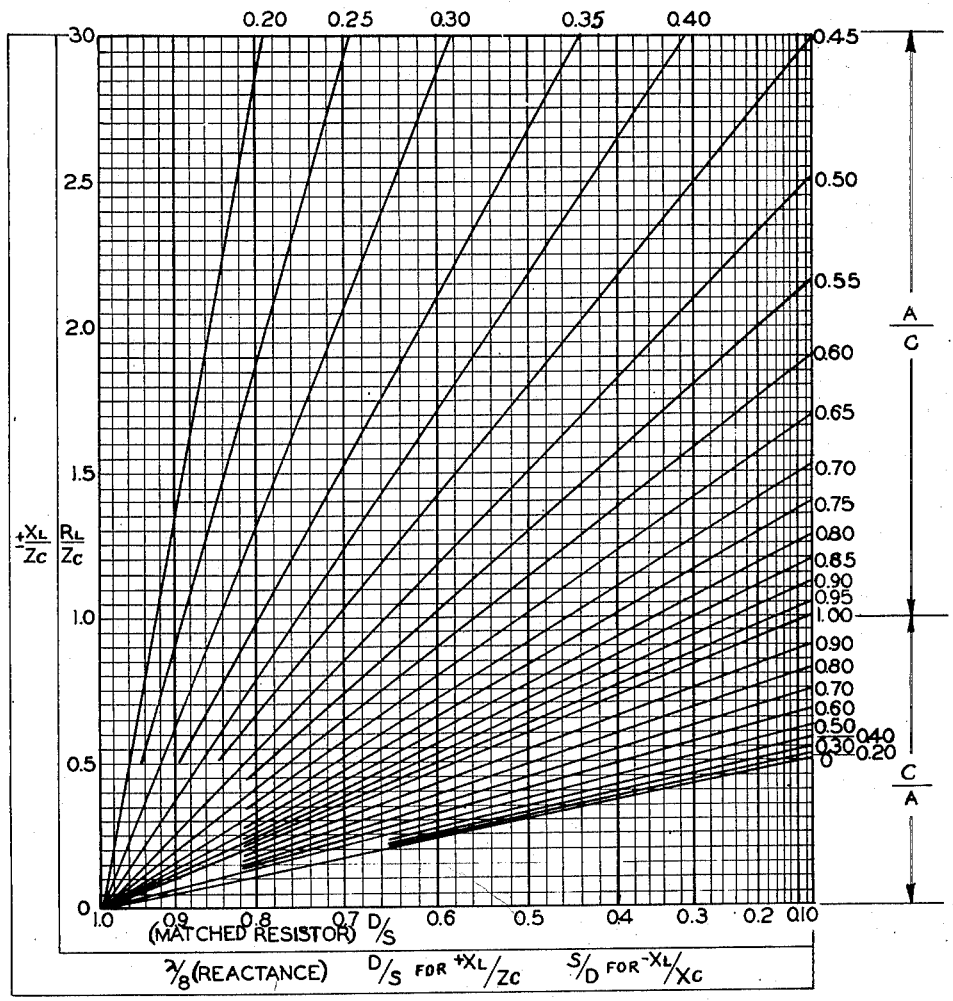

The invention will be described in greater detail by reference to the accompanying drawings of which Figure 1 is a schematic circuit diagram of a first embodiment of the invention, Figure 2 is a schematic diagram explanatory of second and third embodiments of the invention, Figure 3 is a schematic circuit diagram of a detector and the indicator portions of the embodiment of the invention adapted to provide power measurements, Figure 4 is a plan view of a first embodiment of the invention, Figure 5 is a cross-sectional, elevational view taken along the section line V—V of said first embodiment of the invention, Figure 6 is an enlarged, fragmentary, cross-sectional view taken along the section line VI—VI of said first embodiment of the invention, Figure 7 is a cross-sectional view of a second embodiment of the invention, and Figure 8 is a family of graphs indicating transmission line impedance characteristics. Similar reference characters are applied to similar elements throughout the drawings.

Referring to Figure 1, a high frequency generator 1 is connected through a generator coaxial line 3 to a T junction with two other coaxial lines 5, 7 which are connected, respectively, to an adjustable reactor $Z_c$ and to a load. The adjustable reactor may comprise an adjustably short-circuited section of coaxial line of the same surge impedance and short-circuited at the order of one-eighth wavelength from the line junction. A coupling loop 9 comprising a single turn is symmetrically coupled to the branch coaxial lines 5 and 7 at the T junction of the three lines 3, 5 and 7. The coupling loop and the centers of the conductors forming the T junction are in a common plane.

In the device described in said copending application wherein a matched resistive termination is employed in the branch line, zero current will flow in the pickup loop 9 when the load current $I_L$ and the matched line current $I_m$ are equal and in phase. This condition obtains only when the load impedance equals the matched line impedance $Z_c$ since the two branch lines 5 and 7 are fed by a common voltage E at the T junction. The matching reactor or resistor $Z_c$, as the case may be, is assumed to match exactly the surge impedance of the coaxial line 5. For any other load impedance, a resultant current will be induced in the pickup loop 9. This current may be rectified and indicated by means of a detector and a D.-C. meter, not shown, to indicate the degree of mismatch of the load impedance to the surge impedance of the load transmission line 7.

Assuming a mismatched load, a standing wave will be produced as shown in Figure 1.

The impedance of the load line at the junction is $$\bar{Z}_B = \frac{\bar{E}}{\bar{I}_L} \qquad (1)$$

and the impedance of the matched line is $$Z_c = \frac{\bar{E}}{\bar{I}_m} \qquad (2)$$

Hence $$\bar{I}_L = \bar{I}_m \times \frac{Z_c}{\bar{Z}_B} \qquad (3)$$

Obtaining the impedance of $Z_B$ in terms of $Z_A$ and $\rho$, where $\rho$ is the length in electrical degrees from a voltage minimum of the load line 7 to the T junction; and $Z_A$ is the impedance at a point where a voltage minimum occurs:

$$\bar{Z}_B = \frac{\bar{Z}_A + jZ_c \tan \rho}{Z_c + j\bar{Z}_A \tan \rho} \times Z_c$$

or $$\frac{\bar{Z}_B}{Z_c} = \frac{\left(\frac{\bar{Z}_A}{Z_c}\right) + j \tan \rho}{1 + j\left(\frac{\bar{Z}_A}{Z_c}\right) \tan \rho} \qquad (4)$$

But $$Z_A = Z_c \times \mathcal{R} \qquad (5)$$

where $\mathcal{R}$ is the standing wave ratio on the load line. Therefore $$\frac{\bar{Z}_B}{Z_c} = \frac{\mathcal{R} + j \tan \rho}{1 + j\mathcal{R} \tan \rho} \qquad (6)$$

Substituting in Equation 3:

$$\bar{I}_L = \bar{I}_m \frac{(1 + j\mathcal{R} \tan \rho)}{(\mathcal{R} + j \tan \rho)} \qquad (7)$$

The current ($I_0$) induced in the pickup loop is proportional to the difference of the two currents $I_L$ and $I_m$.

$$\bar{I}_0 = K(\bar{I}_L - \bar{I}_m) = K\bar{I}_m \left[\frac{(1 + j\mathcal{R} \tan \rho)}{(\mathcal{R} + j \tan \rho)} - 1\right] \qquad (8)$$

where K is a proportionality constant depending upon the loop area, spacing, frequency, etc.

$$I_0 = (KI_m)\frac{(1 + j\mathcal{R} \tan \rho - \mathcal{R} - j \tan \rho)}{(\mathcal{R} + j \tan \rho)} =$$
$$\left(\frac{KE}{Z_c}\right)\frac{(1 - \mathcal{R})(1 - j \tan \rho)}{(\mathcal{R} + j \tan \rho)} \qquad (9)$$

The absolute value of the pickup loop current is $$|I_0| = \left(\frac{KE}{Z_c}\right)(1 - \mathcal{R})\sqrt{\frac{(1 + \tan^2 \rho)}{(\mathcal{R}^2 + \tan^2 \rho)}} \qquad (10)$$

Assuming a constant standing wave ratio, the pickup loop current will vary as a function of the relative position of the standing wave with respect to the T junction. For this condition the current $I_0$ will vary from a maximum of $$\frac{(1 - \mathcal{R})}{\mathcal{R}}$$

for $\rho = 0°$ to a minimum of $(1 - \mathcal{R})$ for $\rho = 90°$.

$$\frac{I_{min.}}{I_{max.}} = \frac{(1 - \mathcal{R})}{\frac{(1 - \mathcal{R})}{\mathcal{R}}} = \mathcal{R} \qquad (11)$$

Hence the ratio of the minimum current to the maximum current for a constant standing wave ratio and a variable standing wave shift is seen to be equal to the standing-wave-ratio.

For simplicity, a fixed crystal detector, not shown, may be employed as the rectifier in the pickup loop circuit. Therefore, the meter deflection will be proportional to the square of the pickup loop current. Since a constant input voltage E may be assumed, it is seen that, as the load impedance approaches a match with the surge impedance of the transmission line, the rate of change of the indicating meter deflection rapidly diminishes. In actual practice, the load line 7 may be matched with adjustable elements such as inductive stubs, each stub being adjusted in turn for minimum meter deflection until the meter provides null or substantially zero indication. Although the exact standing wave ratio of a mismatched load cannot be obtained directly with this embodiment of the invention, an experienced operator may estimate quite accurately standing wave ratios in the higher range for fixed generator power output.

A second embodiment of the invention is illustrated schematically in Figure 2, wherein the T junction formed by the three coaxial lines 3, 5 and 7 is coupled to a rotatable coupling loop disposed in a plane S—S normal to the common plane through the three coaxial lines forming the T junction. The plane of the coupling loop may be rotated through an angle of 90° to the position D—D. If desired, as explained in greater detail hereinafter, two separate coupling loops may be employed, one being disposed in the plane S—S and the other being disposed in the plane D—D. The two coupling loops would be both magnetically and electrostatically shielded from each other. Lines through the centers of the coupling loops would coincide with the center of the T junction.

Considering first the embodiment of the invention employing a single rotatable coupling loop, in the position S—S the loop is coupled substantially only inductively to the generator coaxial line 3. The coupling is substantially purely inductive since the loop is electrostatically shielded from the coaxial line by slots in the outer conductor of the lines, which will be described in greater detail by reference to the structure of Figures 4, 5 and 6. When the loop is in the plane D—D, it is inductively coupled substantially only to the matched line 5 and the load line 7. When the coupling loop is in the plane D—D, a current $I_D$ is induced in the loop which is proportional to the vector difference of the load current $I_B$ and the matched line current $I_m$. When the loop is in the plane S—S, a current $I_S$ is induced in the loop which is proportional to the vector sum of the load current $I_B$ and the matched line current $I_m$.

$$\bar{I}_m = \frac{\bar{E}}{Z_c} \qquad (12)$$

$$\bar{I}_B = \frac{\bar{E}}{\bar{Z}_B} = \frac{\bar{E}}{R_B + jX_B} \qquad (13)$$

where $R_B$ and $X_B$ are the resistive and reactive components of the load impedance $Z_B$.

$$\bar{I}_m + \bar{I}_B = \frac{\bar{E}}{Z_c} + \frac{\bar{E}}{R_B + jX_B} = \bar{E}\left(\frac{Z_c + R_B + jX_B}{Z_c(R_B + jX_B)}\right) = \left(\frac{\bar{E}}{R_B + jX_B}\right)\left(1 + \frac{R_B + jX_B}{Z_c}\right) \qquad (14)$$

$$\bar{I}_m - \bar{I}_B = \frac{\bar{E}}{Z_c} - \frac{\bar{E}}{R_B + jX_B} = \bar{E}\left(\frac{R_B + jX_B - Z_c}{Z_c(R_B + jX_B)}\right) = \left(-\frac{\bar{E}}{R_B + jX_B}\right)\left(1 - \frac{R_B + jX_B}{Z_c}\right) \qquad (15)$$

The ratio of the absolute magnitudes of the loop currents in the planes D—D and S—S is $$\frac{\bar{I}_D}{\bar{I}_S} = \frac{1 - \frac{R_B + jX_B}{Z_c}}{1 + \frac{R_B + jX_B}{Z_c}} \qquad (16)$$

The general transmission line equation is $$i = \frac{\bar{I}_0}{2}\left(1 - \frac{Z_B}{Z_c}\right)\epsilon^{(\alpha + j\beta)x} + \frac{\bar{I}_0}{2}\left(1 + \frac{Z_B}{Z_c}\right)\epsilon^{-(\alpha + j\beta)x} \qquad (17)$$

wherein the first term is representative of the reflected wave, and the second term is representative of the incident wave in the load line 7. Therefore, it is seen that the ratio of the absolute magnitudes of the currents in the loop when it is oriented in the planes D—D and S—S, provides the ratio of the magnitudes of the reflected wave and of the incident wave, which by definition is the reflection coefficient K. Hence, in operation of the device, if the coupling loop 9 is connected to a linear detector, and the linear detector is connected to a suitable D.-C. indicator, the ratio of the rectified loop currents provides the reflection coefficient K. The indicating meter may be calibrated in terms of the standing wave ratio $\mathcal{R}$ on the load line 7, since $\mathcal{R}$ equals $$\frac{(1-K)}{(1+K)}$$

The gain of the detector or the power output of the generator may be adjusted to provide full scale reflection of the indicator when the loop is in the plane S—S. Then by rotating the loop to the plane D—D, the standing wave ratio $\mathcal{R}$ may be read directly on the meter scale.

The alternative arrangement wherein two loops are employed, one in the plane S—S and the other in the plane D—D, may utilize a single detector and indicator which may be switched to either loop, or separate detectors and indicators may be used. Since the two loops must be magnetically and electrostatically shielded from each other, the most convenient arrangement is to locate them on opposite sides of the T junction and to shield them by means of a magnetic shield disposed in the plane of the T junction, as is shown in Figure 7.

Although the reflectometer is substantially independent of frequency (assuming that the matched resistor is matched at all operating frequencies), the physical size of the coupling loop or loops must be taken into consideration. If the loop is wide enough or the frequency sufficiently high, the loop current will be an integration of the varying line currents produced by mismatch of the load, and will not indicate the load currents flowing only at the T junction.

It is noted that when the loop is in the plane D—D, the device operates in essentially the same manner as that described heretofore with respect to the arrangement of Figure 1. However, by providing the rotatable coupling loop, or by utilizing two coupling loops disposed at right angles, the device provides the additional indications of load power, load matching, reflection coefficient, and standing-wave-ratio.

For measurement of load power (see Figure 3), the loop in the plane S—S is connected to a first square-law detector 11, and the loop in the plane D—D is connected to a second square-law detector 13. The rectified output currents $I'_S$ and $I'_D$ from the two square-law detectors are connected in series opposition to a common D.-C. current indicator 15 whereby $$I'_S = [N(\bar{I}_B + \bar{I}_m)]^2 = N^2 I_B^2\left(\frac{1}{Z_c} + \frac{2R_B}{Z_c} + \frac{R_B^2}{Z_c^2} + \frac{X_B^2}{Z_c^2}\right) \qquad (18)$$

$$I'_D = [N(\bar{I}_B - \bar{I}_m)]^2 = N^2 I_B^2\left(\frac{1}{Z_c} - \frac{2R_B}{Z_c} + \frac{R_B^2}{Z_c^2} + \frac{X_B^2}{Z_c^2}\right) \qquad (19)$$

$$I'_S - I'_D = \left(\frac{4R_B}{Z_c}\right)(N^2 I_B^2) \qquad (20)$$

$$P_B = I_B^2 R_B \qquad (21)$$

$$\therefore I'_S - I'_D = \frac{4N^2}{Z_c} P_B \qquad (22)$$

wherein N is a proportionality constant.

The power indicating meter 15 may be calibrated by applying known values of power to the load.

Again referring to Figure 2, the absolute magnitude and the phase angle of the load impedance may be determined by deriving the loop currents in two additional planes A—A and C—C which are disposed at 45° angles with respect to the conductors forming the T junction. The current $I_C$ in the coupling loop when it is disposed in the plane C—C is $$\bar{I}_C = \frac{\bar{I}_m}{\sqrt{2}} + \frac{\bar{I}_m}{\sqrt{2}} = \sqrt{2}\,\bar{I}_m \qquad (23)$$

since components of the load current $I_B$ flow in opposite directions when the loop is in the plane C—C.

$$\bar{I}_A = \frac{\bar{I}_B}{\sqrt{2}} + \frac{\bar{I}_B}{\sqrt{2}} = \sqrt{2}\, \bar{I}_B \qquad (24)$$

since components of the matched line current $I_m$ flow in opposite directions when the coupling loop is in the plane A—A $$\bar{I}_m = \frac{\bar{E}}{Z_c} \qquad (25)$$

$$\bar{I}_B = \frac{\bar{E}}{\bar{Z}_B} \qquad (26)$$

$$\frac{\bar{I}_m}{\bar{I}_B} = \frac{\bar{Z}_B}{Z_c} = \frac{\bar{I}_C}{\bar{I}_A} \qquad (27)$$

Hence the ratio of the loop currents in the two planes C—C and A—A provides the absolute magnitude of the load impedance in terms of the line characteristic impedance. Since $$I_S = [I_m + I_B \cos\phi + jI_B \sin\phi] \qquad (28)$$

$$I_D = [I_m - I_B \cos\phi - jI_B \sin\phi] \qquad (29)$$

where $\phi$ is the phase angle of the load impedance $$I_S^2 = I_m^2 + 2I_m I_B \cos\phi + I_B^2 \qquad (30)$$

$$I_D^2 = I_m^2 - 2I_m I_B \cos\phi + I_B^2 \qquad (31)$$

$$I_S^2 - I_D^2 = 4I_m I_B \cos\phi \qquad (32)$$

$$I_m I_B = \frac{I_A I_C}{2} \qquad (33)$$

$$\therefore \cos\phi = \frac{I_S^2 - I_D^2}{2 I_A I_C} \qquad (34)$$

$$\phi = \cos^{-1}\frac{I_S^2 - I_D^2}{2 I_A I_C} \qquad (35)$$

It should be noted that the sign of the phase angle is not obtained by these measurements when a matched resistive termination is employed on the branch line as in the systems described in said copending application.

In accordance with the instant invention, the sign as well as the magnitude of the reactive component of the load impedance may be found by replacing the matched resistor $Z_c$ by an adjustable reactance comprising a short-circuited section 21 of coaxial line replacing the branched line 5, and by taking the loop current ratio as described heretofore. The short-circuited section of coaxial line is adjusted to a length of the order of $\lambda/8$ at the operating frequency so as to present a reactance at the center of the T junction equal to $+jZ_c$. Hence $$\bar{I}_m = \frac{\bar{E}}{+jZ_c} \qquad (36)$$

and $$\bar{I}_m = \bar{I}_L\left(\frac{X_L}{Z_c} - j\frac{R_L}{Z_c}\right) \qquad (37)$$

With the coupling loop 9 in position D, the current $$\bar{I}_D = T(\bar{I}_L - \bar{I}_m) = T\bar{I}_L\left(1 - \frac{X_L}{Z_c} + j\frac{R_L}{Z_c}\right) \qquad (38)$$

Likewise with the coupling loop in the position S, the current $$\bar{I}_S = T(\bar{I}_L + \bar{I}_m) = T\bar{I}_L\left(1 + \frac{X_L}{Z_c} - j\frac{R_L}{Z_c}\right) \qquad (39)$$

where $T$ is the proportionality constant depending upon the operating frequency and the physical dimensions of the device.

Designating the ratio of the detector output currents in this instance by $K'$, $$K' = \frac{I_D'}{I_S'} = \sqrt{\frac{1 - \frac{2X_L}{Z_c} + \left(\frac{|Z_L|}{Z_c}\right)^2}{1 + \frac{2X_L}{Z_c} + \left(\frac{Z_L}{Z_c}\right)^2}} \qquad (40)$$

and solving for $$\frac{X_L}{Z_c}$$

$$\frac{X_L}{Z_c} = \frac{(1 - K'^2)}{2(1 + K'^2)}\left[\left(\frac{Z_L}{Z_c}\right)^2 + 1\right] \qquad (41)$$

The ratio of the detector currents for the loop positions C and A will be the same whether the reactive stub or the matched branch line resistor are employed since the equations for the resistive component and the reactive component are identical in form. The adjustable reactive stub may be calibrated in terms of frequency for convenience of use.

Since the reactance of a short-circuited line of $\theta$ electrical degrees in length is $$X = +jZ_c \tan\theta \qquad (42)$$

the stub may be somewhat shorter than $\frac{1}{8}$ wavelength if its characteristic impedance is raised, the only requirement being that its reactance be equal to the characteristic impedance of the load line.

For a particular frequency of operation, the stub length to provide the required reactance may be determined quite easily without the use of the slotted measuring line technique. The load line may be replaced by the reactive stub, and the matched resistor connected to the branch line side of the device. Since it has been shown that the absolute magnitude of the load impedance in terms of the characteristic impedance is equal to the ratio of the loop currents for the two loop positions C and A, the stub is adjusted until this ratio is unity.

The chart of Figure 8 indicates that the resistive and reactive components of the load impedance may be obtained from the various loop positions of the device.

As an example of its use, an unknown load and the matched resistor are connected as shown in Figure 2. The loop is rotated in the four positions to give the current ratios of $D/S$ and $A/C$ (or $C/A$). For a $D/S$ ratio of 0.46 and a $A/C$ ratio of 0.65 the resistive component of the load impedance in terms of the characteristic impedance is found to be 1.10. The matched resistor is then replaced by the eighth-wave stub and the current ratio $D/S$ (or $S/D$) determined. Using the same $A/C$ value of 0.65 previously found, it is seen that the reactive component of the load impedance in terms of the characteristic impedance is equal to $-0.75$ for a $S/D$ ratio of 0.62. For a characteristic impedance equal to 52 ohms the load impedance is then equal to $$(1.10 - j0.75)(52) = 57.2 \text{ ohms} - j39. \text{ ohms} \qquad (43)$$

Figures 4, 5 and 6 show the construction of the first embodiment of the invention wherein the coupling loop is rotatable in a plane normal to the plane of the coaxial lines 3, 5, 7, forming the T junction. The coupling loop 9 comprises a single loop of wire supported in an insulating block 25 which is rotatable by means of a control shaft 27 within a bearing formed by means of a shoulder 29 supported by the frame 31 which is clamped to the coaxial lines at the T junction.

The coupling loop 9 is brought out to a grounded terminal 33 and an ungrounded terminal 35 which may be connected in any desired manner to a linear detector 37 which is connected to a D.-C. indicator 39. Inductive coupling, but substantially perfect electrostatic shielding, between the inner conductors of the coaxial lines and the coupling loop, is provided by means of slots 41 cut in the sides of the outer conductors of the coaxial lines 3, 5, 7, immediately adjacent the T junction.

The control shaft 27 may include a stop element 43 which cooperates with two fixed stops 45 and 47 to permit rotation of the coupling loop only within an angle of 90° to provide for alternate coupling to either the generator line or to the load and matched lines, for providing indications of load matching, load current, reflection coefficient or standing-wave-ratio, as described heretofore.

If the system is to be employed for measurement of absolute load impedance or load impedance phase angle, the stops should be located to permit the coupling loop also to be oriented in the planes A—A and C—C, as described with reference to Figure 2.

The structure of Figure 7 comprises a second embodiment of the invention which is a modification of the structures of Figures 4, 5 and 6, wherein a second coupling loop 19 is disposed on the opposite side of the T junction from the first coupling loop 9. The coupling loops may be connected to the same detector and indicator by simple switching means, not shown, or they may be connected to separate detectors and indicators as explained heretofore.

In order to provide magnetic shielding between the coupling loops 9 and 19, a flat shielding member 49 is interposed between the outer conductors of the three coaxial lines 3, 5 and 7 in the space adjacent the T junction enclosed within the frame 31. The load and matched line outer conductors are slotted adjacent the T junction on the side of the shielding member 49 adjacent to the first coupling loop 9. The generator line outer conductor is slotted on the opposite or underside of the shielding plate 49 adjacent the T junction. Thus, the first coupling loop 9 is inductively coupled to and capacitively shielded from the load and matched lines 5 and 7, and the second coupling loop 19 is inductively coupled to and capacitively shielded from the generator line 3. However, the coupling loops 9 and 19 are both electrostatically and magnetically shielded from each other. Thus, two fixed coupling loops are disposed at right angles for obtaining the load power measurements described heretofore.

Thus the invention described comprises several embodiments and modifications of an improved reflectometer for indicating load matching, load impedance, the magnitude and sign of the load impedance phase angle, load power, reflection coefficient and standing-wave-ratio in a line connecting a generator to an unknown load.

I claim as my invention:

1. A device for determining the phase angle of currents delivered to a load from a transmission line, including a T junction in said transmission line, means for connecting said load to one branch of said junction, an element having a reactance substantially equal in magnitude to the surge impedance of said transmission line, means for connecting said reactance element to the other branch of said junction, means for selectively deriving currents proportional respectively to the vector sum and to the vector difference of currents in said branches of said junction, and means for detecting and indicating said derived currents whereby the relative magnitudes of said detected currents are characteristic of the magnitude and sign of the phase angle of the currents in said load.

2. A device for determining the phase angle of currents delivered to a load from a coaxial transmission line including a plurality of sections of coaxial line forming substantially a T junction, means for connecting said transmission line to one of said line sections, means for connecting said load to another one of said line sections, an element having a reactance substantially equal in magnitude to the surge impedance of said transmission line, means for connecting said reactance element to the remaining one of said line sections, means for selectively deriving currents proportional respectively to the vector sum and to the vector difference of currents in said line sections connected to said load and said reactance element, and means for detecting and indicating said derived currents whereby the relative magnitudes of said detected currents are characteristic of the magnitude and sign of the phase angle of the currents in said load.

3. A device for determining the phase angle of currents delivered to a load from a coaxial transmission line and the impedance of said load including a plurality of sections of coaxial line forming substantially a T junction, means for connecting said transmission line to one of said line sections, means for connecting said load to another one of said line sections, an element having a reactance substantially equal in magnitude to the surge impedance of said transmission line, means for connecting said reactance element to the remaining one of said line sections, means for selectively deriving currents proportional respectively to the vector sum and to the vector difference of currents in said line sections connected to said load and said reactance element, means for detecting said derived currents, and means for indicating said detected currents whereby the relative magnitudes of said detected currents are characteristic of the impedance of said load and the magnitude and sign of the phase angle of the currents in said load.

4. A device for determining the phase angle of currents delivered to a load from a coaxial transmission line and the impedance of said load including a plurality of sections of coaxial line forming substantially a T junction, means for connecting said transmission line to one of said line sections, means for connecting said load to another one of said line sections, a reactance element substantially equal in magnitude to the surge impedance of said transmission line, means for connecting said reactance element to the remaining one of said line sections, a rotatable coupling loop selectively inductively coupled to and capacitively shielded from said load line and element line sections at said junction, means for connecting energy detecting means responsive to currents induced in said coupling loop, means for orienting said loop selectively to induce currents therein proportional respectively to the vector sum and to the vector difference of currents in said line sections connected to said load and said reactance element, means for detecting and indicating said induced currents whereby the relative magnitudes of said detected currents are characteristic of the impedance of said load and the magnitude and sign of the phase angle of the currents in said load.

5. A device for determining the phase angle of currents delivered to a load from a coaxial transmission line including a plurality of sections of coaxial line forming substantially a T junction, means for connecting said transmission line to one of said line sections, means for connecting said load to another one of said line sections, a reactance element substantially equal in magnitude to the surge impedance of said transmission line, means for connecting said reactance element to the remaining one of said line sections, a rotatable coupling loop selectively inductively coupled to and capacitively shielded from said load line and element line sections at said junction, means for connecting energy detecting means responsive to currents induced in said coupling loop, means for orienting said loop selectively to induce currents therein proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

6. A device for determining the phase angle of currents delivered to a load from a coaxial transmission line including a plurality of sections of coaxial line forming substantially a T junction, means for connecting said transmission line to one of said line sections, means for connecting said load to another one of said line sections, a substantially eighth-wave coaxial reactance element substantially equal in magnitude to the surge impedance of said transmission line, means for connecting said reactance element to the remaining one of said line sections, a rotatable coupling loop selectively inductively coupled to and capacitively shielded from said load line and element line sections at said junction, means for connecting energy detecting means responsive to currents induced in said coupling loop, means for orienting said loop selectively to induce currents therein proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

7. Apparatus according to claim 6 wherein said coaxial reactance element has a surge impedance substantially equal to the surge impedance of said transmission line.

8. Apparatus according to claim 6 wherein said coaxial reactance element has a surge impedance substantially different than the surge impedance of said transmission line.

9. A device for determining the phase angle of currents delivered to a load from a coaxial transmission line including a plurality of sections of coaxial line forming substantially a T junction, means for connecting said transmission line to one of said line sections, means for connecting said load to another one of said line sections, a substantially eighth-wave tunable coaxial reactance element substantially equal in magnitude to the surge impedance of said transmission line, means for connecting said reactance element to the remaining one of said line sections, a rotatable coupling loop selectively inductively coupled to and capacitively shielded from said load line and element line sections at said junction, means for connecting energy detecting means responsive to currents induced in said coupling loop, means for orienting said loop selectively to induce currents therein proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

10. A device for determining the phase angle of currents delivered to a load from a coaxial transmission line including a plurality of sections of coaxial line forming substantially a T junction, means for connecting said transmission line to one of said line sections, means for connecting said load to another one of said line sections, a reactance element substantially equal in magnitude to the surge impedance of said transmission line, means for connecting said reactance element to the remaining one of said line sections, a pair of normally disposed coupling loops selectively inductively coupled to and capacitively shielded from said line sections at said junction, means for connecting energy detecting means responsive to currents induced in said coupling loops proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

11. A device for determining the phase angle of currents delivered to a load from a coaxial transmission line including a plurality of sections of coaxial line forming substantially a T junction, means for connecting said transmission line to one of said line sections, means for connecting said load to another one of said line sections, a substantially eighth-wave coaxial reactance element substantially equal in magnitude to the surge impedance of said transmission line, means for connecting said reactance element to the remaining one of said line sections, a pair of normally disposed coupling loops selectively inductively coupled to and capacitively shielded from said line sections at said junction, means for connecting energy detecting means responsive to currents induced in said coupling loops proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

12. A device for determining the phase angle of currents delivered to a load from a coaxial transmission line including a plurality of sections of coaxial line forming substantially a T junction, means for connecting said transmission line to one of said line sections, means for connecting said load to another one of said line sections, a substantially eighth-wave tunable coaxial reactance element substantially equal in magnitude to the surge impedance of said transmission line, means for connecting said reactance element to the remaining one of said line sections, a pair of normally disposed coupling loops selectively inductively coupled to and capacitively shielded from said line sections at said junction, means for connecting energy detecting means responsive to currents induced in said coupling loops proportional respectively to the vector sum and to the vector difference of currents in said line sections connected to said load and said reactance element, means for detecting and indicating said induced currents whereby the relative magnitudes of said detected currents are characteristic of the magnitude and sign of the phase angle of the currents in said load.

13. Apparatus for determining the phase angle of energy applied through a transmission line to a load comprising a reactance element, means for separately coupling said line to said element and said load, means for deriving currents from said line proportional respectively to the vector sum and to the vector difference of the currents applied to said element and to said load, and means for indicating said derived currents whereby the relative magnitudes thereof are characteristic of the magnitude and sign of the phase angle of said energy applied to said load.

14. Apparatus for determining the phase angle of energy applied through a transmission line to a load comprising a reactance element, means for separately coupling said line to said element and said load, means for deriving currents from said line proportional respectively to the vector sum and to the vector difference of the currents applied to said element and to said load, and means for detecting and indicating said derived currents whereby the relative magnitudes thereof are characteristic of the magnitude and sign of the phase angle of said energy applied to said load.

15. Apparatus according to claim 13 including means for adjusting the reactance of said element to a value substantially equal in magnitude to the surge impedance of said line.

GEORGE H. BROWN.

REFERENCES CITED

The following references are of record in the file of this patent:

UNITED STATES PATENTS

| Number | Name | Date |
|---|---|---|
| 2,288,030 | Salinger | June 30, 1942 |
| 2,314,764 | Brown | Mar. 23, 1943 |
| 2,323,076 | Paul | June 29, 1943 |
| 2,337,934 | Scheldorf | Dec. 28, 1943 |
| 2,403,289 | Korman | July 2, 1946 |
| 2,412,393 | Ghosh | Dec. 10, 1946 |
| 2,416,790 | Barrow | Mar. 4, 1947 |
| 2,422,601 | Tashjian | June 17, 1947 |
| 2,425,084 | Cork et al. | Aug. 5, 1947 |
| 2,445,895 | Tyrrell | July 27, 1948 |
| 2,527,979 | Woodward, Jr. | Oct. 31, 1950 |

OTHER REFERENCES

Electronics, April 1947, pp. 116–120.